E. M. WHEELOCK.
AUTOMATIC STEERING DEVICE FOR MOTOR PROPELLED VEHICLES.
APPLICATION FILED MAY 20, 1912.
1,052,868.
Patented Feb. 11, 1913.
2 SHEETS—SHEET 1.
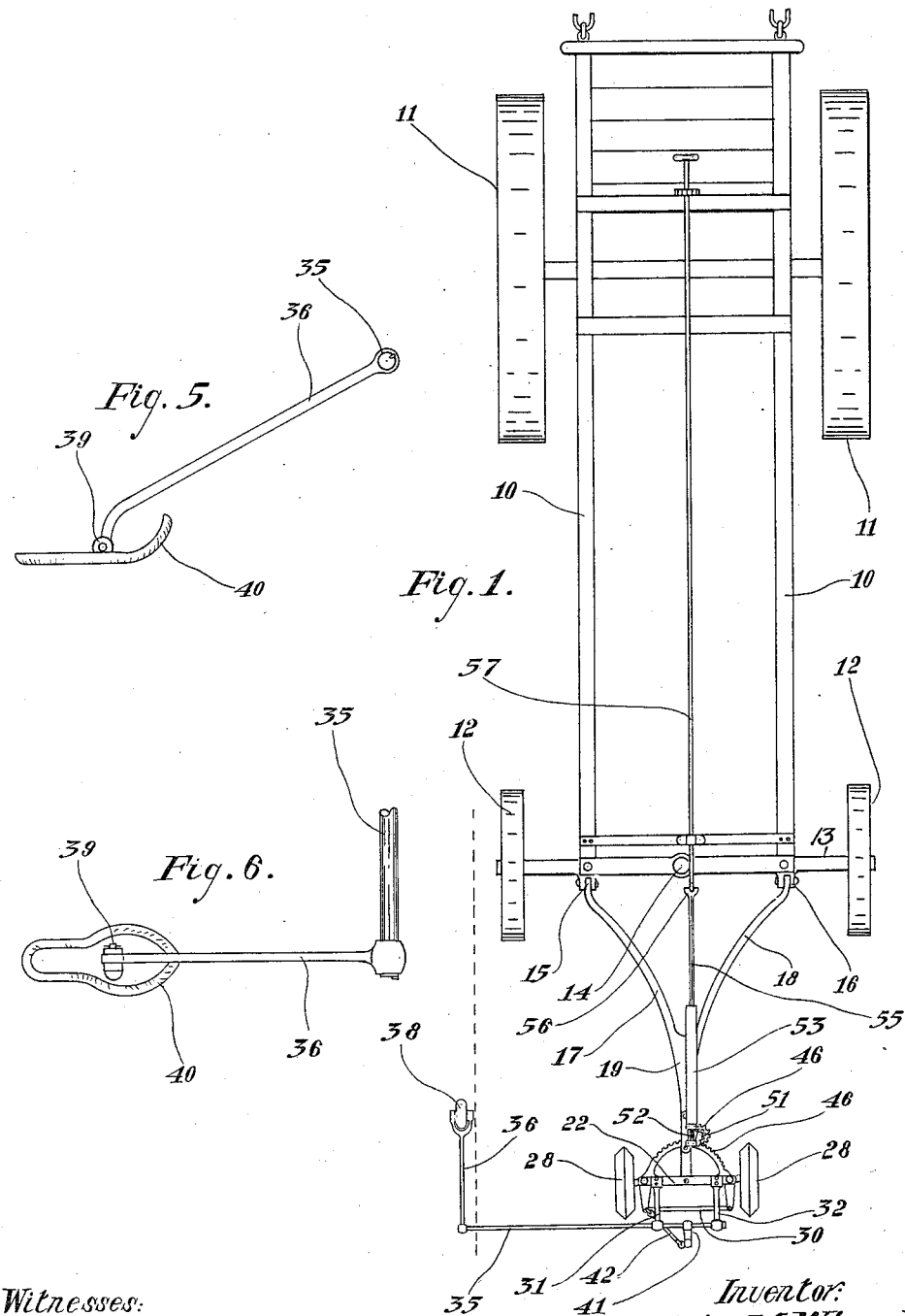
Witnesses:
D. W. Edelin
Alys. Scott
Inventor:
Edwin M. Wheelock
by F. A. Whitely
his attorney E. M. WHEELOCK.
AUTOMATIC STEERING DEVICE FOR MOTOR PROPELLED VEHICLES.
APPLICATION FILED MAY 20, 1912.
1,052,868.
Patented Feb. 11, 1913.
2 SHEETS—SHEET 2.
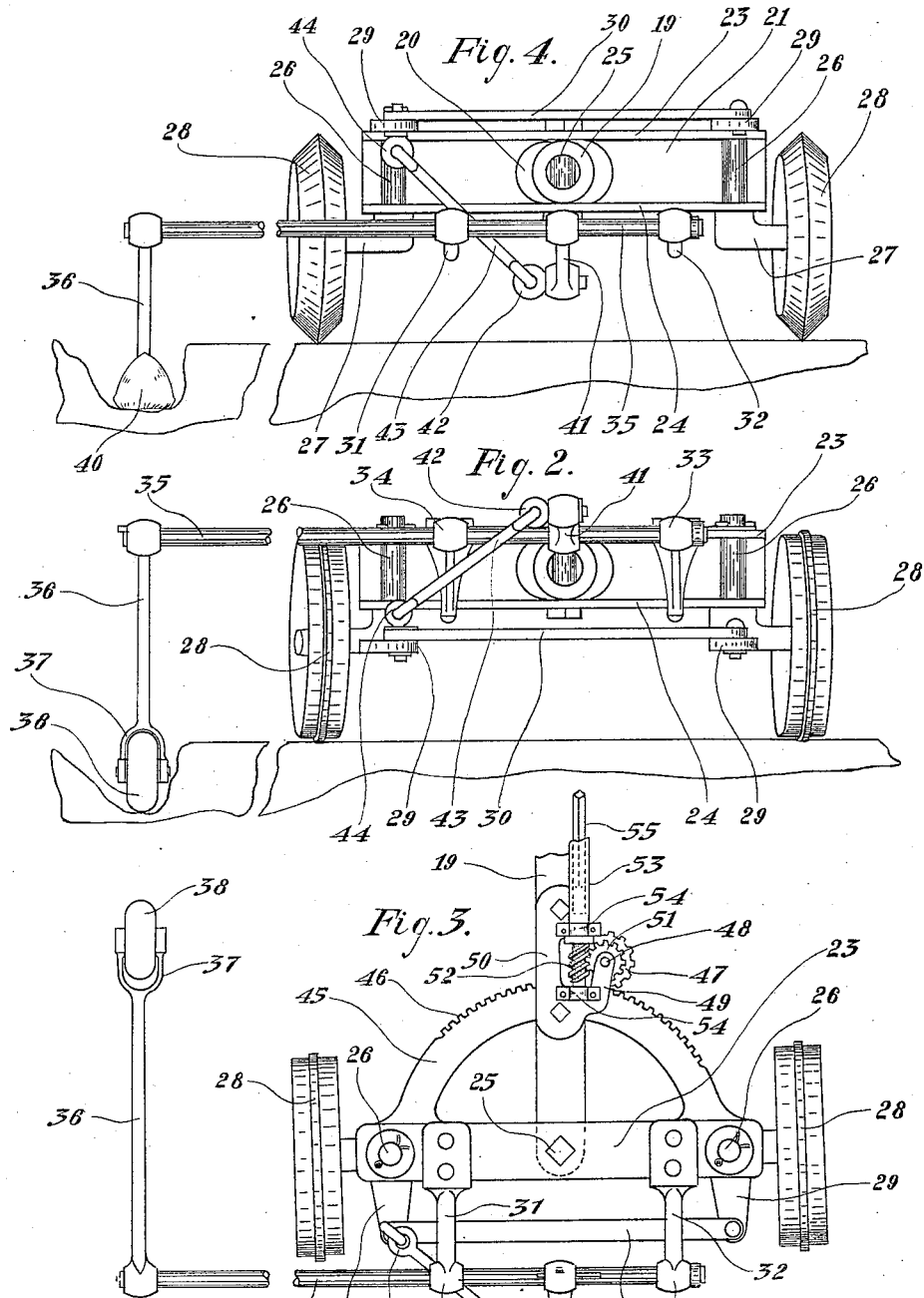

UNITED STATES PATENT OFFICE.

EDWIN M. WHEELOCK, OF WINONA, MINNESOTA.

AUTOMATIC STEERING DEVICE FOR MOTOR-PROPELLED VEHICLES.

1,052,868. Specification of Letters Patent. Patented Feb. 11, 1913.

Application filed May 20, 1912. Serial No. 698,649.

*To all whom it may concern:*

Be it known that I, EDWIN M. WHEELOCK, a citizen of the United States, residing at Winona, in the county of Winona and State of Minnesota, have invented certain new and useful Improvements in Automatic Steering Devices for Motor-Propelled Vehicles, of which the following is a specification.

My invention relates to automatic steering devices for motor propelled vehicles, particularly such vehicles when related to agricultural or similar operations in which it is desirable to guide the vehicle or implement at a fixed distance from some definite line or mark in the surface of the ground, such as a plow furrow in connection with the use of a plowing device or any furrow mark along the surface of the ground where the machine is used in connection with seeding or planting or similar operations.

Devices have heretofore been employed in connection with traction engines when the same are used to pull plows in which the guiding wheel having connection with the steering axle of the traction engine runs in the furrow, being turned so that the same tends to run toward the land side wall of the furrow, guiding the engine by constant engagement with said side wall. A serious objection to this form of device resides in the fact that since the guide wheel is constantly striving to move away from the furrow, if the furrow becomes filled or for any reason disappears even for but a few inches of its length, the guide wheel will mount to the level of the surface outside of the furrow and run away from the same. This, of course, would carry the traction engine and plows too far from the furrow, and in fact would run the same around in a circle unless controlled by the operator. In this type of guiding device, therefore, there is no truly automatic steering since the capacity of the device for steering the engine will depend upon a furrow of a given and practically uniform depth and nearly perfect land side wall. Since such a furrow is rarely present, the operator must, therefore, constantly watch this type of furrow guiding device and be prepared to turn the same back into the furrow whenever it shall climb out.

I have discovered that if means traveling in the bottom of a furrow are employed which will oscillate the guiding wheel or wheels, whether in a furrow or not, so as to turn them slightly toward said furrow or guiding mark whenever the said device running along the bottom thereof is elevated by reason of filling of the furrow, climbing up the landside, or otherwise, the guide wheels will be caused to travel absolutely automatically along said mark, and the steering of the traction engine or power propelled vehicle or agricultural implement will be correspondingly automatic.

It is the chief object of my invention, therefore, to provide one or more steering wheels in advance of the motor propelled vehicle and having connection with the steering wheels of said vehicle which can be oscillated by the operator from the engine to steer the machine, in combination with a member to run in a furrow of any sort, whether a plow furrow or a guiding mark, and which will operate automatically to oscillate said steering wheels independently of the operator whenever the furrow member is changed in vertical relation to said steering wheels.

In practice, the steering wheels will automatically be set to run the barest trifle away from the furrow when the furrow member is positioned in the furrow at a determined depth which will be the normal depth of the furrow. If the furrow is deepened at any point so that the furrow member drops therein, the steering wheels would be turned still farther away from the furrow, and the furrow member would be caused to move up along the wall of the furrow. But the moment it rises past the normal depth, the steering wheel will begin to be turned in toward the furrow which will permit the furrow member again to seek the bottom of the furrow. The same is true of obstructions or filling of the furrow. As the furrow member rides over said obstruction, the angularity of the steering wheel is directed in toward the furrow so that when the obstruction is past, the furrow member will again drop into the furrow and by so doing oscillate the wheels so as to turn them slightly away from the furrow. These movements are, of course, very small and the operation of the device comprises a series of checks and counterchecks very much like the action of a governor in an engine, the first tendency to change in elevation bringing an instant response to the steering device so that the ultimate result is to cause the machine to follow absolutely the course of the furrow with a tendency to straighten that course in succeeding operations, if it was originally more or less irregular.

The full objects and advantages of my invention will appear in connection with the detailed description thereof, and are particularly pointed out in the claims.

In the drawings illustrating the application of my invention in one form, Figure 1 is a plan view of a traction engine or motor propelled vehicle or agricultural implement having my improved steering mechanism connected therewith. Fig. 2 is an end elevation view of the steering device. Fig. 3 is a plan view of the same. Fig. 4 is a view of a modification. Figs. 5 and 6 are detail views of a form of the furrow member.

Shown diagrammatically in Fig. 1 are the frame members 10, traction wheels 11, steering wheels 12 on a steering axle 13, of a traction engine or motor propelled vehicle. In place of the transverse axle 13 and two steering wheels 12 as shown, it is obvious that a single steering wheel such as is frequently used in motor propelled vehicles may be substituted. The axle 13 is pivotally connected at the center thereof to the frame 10 as indicated at 14, either by a king bolt or ball and socket joint of well known construction. Pivoted to the axle 13 at 15 and 16 are arms 17 and 18, respectively, which extend forward meeting in a tongue-like furrow member 19 which may, if desired, be tubular at its end as indicated in Fig. 4. The member 19 extends through an elongated aperture 20 in the web 21 of a channeled cross-bar 22. This cross-bar is provided with forwardly extending flanges 23 and 24 through which extends a king bolt 25, the same passing through the end of the tongue 19, as clearly shown in Fig. 3. Having bearings in the flanges 23 and 24 at the ends of cross-bar 22 are crank axles 26 upon the horizontal portions 27 of which are journaled steering wheels 28 which may be provided with a V-shaped rim as indicated in Figs. 1, 2, and 4, or with a flat rim having a peripheral flange as indicated in Fig. 3. The axles 26 are each provided with forwardly extending arms 29. As indicated in Figs. 2 and 3, the arms 29 are at the bottom of the axles 26 below flange 24 while, as shown in Fig. 4, the arms 29 are positioned above the flange 23, the structures being obviously alternative equivalents to be adopted in accordance with the choice of the designer. The arms 29 are pivotally connected by a link 30 so that movement of one of said arms and the axles and wheels 28 connected therewith will correspondingly move the other. As shown in Figs. 1 and 2 in which the arms 29 are at the bottoms of axles 26, forwardly extending brackets 31 and 32 are secured to the flange 23, extending outwardly in the plane thereof. Journaled in bearings 33 and 34 in said arms is a rock shaft 35 having fast on the end thereof an arm 36 which may be provided with a fork 37 and roller 38 or may, as shown in Figs. 4, 5, and 6, be pivotally connected at 39 with a shoe 40 having the general form indicated in the above named figures. The rock shaft 30 has connected therewith an arm 41 carrying at its end a swivel-eye 42 with which is connected a link 43 in turn connected to a swivel-eye 44 on the left hand arm 29. As shown in Fig. 4, the brackets 31 and 32 are secured to the lower flange 24, and the arm 41 from rock shaft 35 turns rearwardly instead of forwardly as indicated in Fig. 3.

Rigidly formed as a continuation of top flange 23 is a half circle 45 formed with a gear segment 46 on its outer periphery. In mesh with the segment 46 is a spur gear 47 on a short vertical shaft 48 journaled in brackets 49 extending from a piece 50 secured to tongue 19. Also on shaft 48 is a worm wheel 51 meshing with a worm 52 on a shaft 53 journaled in bearings 54 on said worm 52. The shaft 53 is provided with a square socket in which slides a squared shaft 55 connected by a universal joint 56 with a steering shaft 57 mounted in the frame of the machine and operated by hand wheel 58 conveniently located with respect to the operator's platform. By rotating rod 57, the rod 55 will be correspondingly rotated, and through socketed rod 53, worm 52, worm wheel 51, spur gear 47, and segment 46, the cross member 22 and steering wheels thereon may be oscillated as desired by the operator, the worm wheel connection holding the parts locked wherever set.

In operation, whether the device is designed as shown in Figs. 2 and 3 or as shown in Fig. 4, the operator will set the steering wheels 28 so that when the furrow member 38 or 40 is at the normal bottom of a furrow, the wheels 28 will extend very slightly oblique to the longitudinal direction of the furrow which, of course, will make them very slightly oblique to the arm 36 which will track above the furrow. When the vehicle is in motion, therefore, the wheels 28 will tend slightly to run off but when the furrow member 38 is pulled up the wall of the furrow or rises relative to wheels 28 from any cause, the arm 41 will thrust on the link 43 and through arm 29 oscillate the wheels 28 so as to turn them toward the furrow. This will cause the steering wheels to tend to move in toward the furrow and permit the furrow member (either the roller 38 or the shoe 40) again to drop which will operate to oscillate the wheels 28 in the opposite direction. The effect of this operation will, in fact, be to keep the wheels 28 at all times running substantially parallel to the furrow and the vehicle will be guided absolutely automatically thereby.

Not only will this device be valuable as a guiding device for a traction engine in plowing but it may be applied to power seeders and planters, cultivators, or in fact any implement in which a shallow furrow will be made by a marker provided for that purpose for guiding the implement in its next trip across the field.

I believe the application of the principle of a mechanism operated through the depth of the furrow to oscillate steering wheels and thereby effect the guiding of a power driven vehicle to be strictly new, and, therefore, intend to claim the same broadly.

I claim:

1. A steering device for power propelled vehicles comprising pilot wheels, and means adapted to run in a furrow and operating to oscillate said wheels through movements thereof relative to the wheels caused by changes in depth of the furrow.

2. A steering device for power propelled vehicles comprising pilot wheels, means under the control of the operator for oscillating said wheels from the vehicle, and means adapted to run in a furrow and operating to oscillate said wheels independently through movements thereof relative to said wheels caused by changes in depth of the furrow.

3. A steering device for power propelled vehicles comprising pilot wheels, a member adapted to run in a furrow, and means having connection with said member and moved thereby through changes of depth in the furrow to oscillate said pilot wheels.

4. A steering device for power propelled vehicles comprising pilot wheels, a member adapted to run in a furrow and means including a rock shaft having connection with said member and moved thereby through changes of depth in the furrow to oscillate said pilot wheels.

5. A steering device for motor propelled vehicles comprising steering wheels connected therewith and adapted to run upon the same surface as the traction wheels of the vehicle, a controlling member for running in a furrow or depressed mark which is to serve as a guide for the vehicle, and means connecting the furrow member and the steering wheels such that changes in depth of the furrow will cause said furrow member to operate said connections and cause the same to oscillate the steering wheels.

6. A steering device for motor propelled vehicles comprising a steering wheel connected therewith, a controlling member for running in a furrow or depressed mark which is to serve as a guide for a vehicle, and means connecting the furrow member and the steering wheels such that changes in the vertical position of said furrow member relative to the steering wheel will operate said connections and cause the same to oscillate the steering wheel.

7. A steering device for motor propelled vehicles comprising a pilot wheel, and means adapted to run in a furrow and operating to oscillate said wheel through vertical movement of said means relative to the wheel.

8. A steering device for motor propelled vehicles comprising a pilot wheel, means under the control of the operator for oscillating said wheel from the vehicle, and means adapted to run in a furrow and operating automatically and independently to oscillate said wheel through vertical movement of the means relative to the wheel.

9. A steering device for motor propelled vehicles comprising a steering wheel connected therewith, means under the control of the operator for oscillating said wheel from the vehicle, a controlling member for running in a furrow or depressed mark which is to serve as a guide for the vehicle, and means connecting the controlling member and the steering wheel such that vertical movement of the member in the furrow relative to the steering wheel will operate said connections and cause the same to automatically and independently oscillate the steering wheel.

10. In a motor propelled vehicle having front axle and steering wheels, a frame connected to said front axle and adapted to oscillate the same, a pilot wheel connected with said frame, a controlling member adapted to run in the furrow and means carried by the frame connecting the controlling member and the steering wheel such that vertical movement of the controlling member relative to the pilot wheel will operate said connections and cause the same to oscillate the pilot wheel.

11. A steering device for motor propelled vehicles comprising a steering wheel connected therewith, a controlling member adapted to run in a furrow, and means including a rock shaft connecting the furrow member and the steering wheel such that vertical movement of the furrow member relative to the steering wheel will operate said connections and cause the same to oscillate the steering wheel.

12. In combination with a motor propelled vehicle including steering wheels and an axle, a frame connected with said axle, a two-wheeled pilot truck carried by said frame, said pilot wheels being movable on vertical axes in the frame, a controlling member adapted to run in a furrow, and means connecting the controlling member and the pilot wheels such that vertical movement of the controlling member relative to the pilot wheels will operate said connections and cause the same to oscillate the pilot wheels on their vertical axles.

13. In combination with a motor propelled vehicle including steering wheels and an axle, a frame connected with said axle, a two-wheeled pilot truck carried by said frame, said pilot wheels being movable on vertical axes in the frame, a rock shaft journaled parallel with said truck, an arm carrying a furrow engaging member secured to said rock shaft, and means connecting the rock shaft and the pilot wheels such that oscillation of the arm in a vertical plane will operate to oscillate the pilot wheels in a horizontal plane.

14. In combination with a motor propelled vehicle including steering wheels and an axle, a frame connected with said axle, a two-wheeled pilot truck carried by said frame, said pilot wheels being movable on vertical axes in the frame, a rock shaft journaled parallel with said truck, an arm carrying a furrow engaging member secured to said rock shaft, a second arm on the rock shaft, an arm on the vertical axle extending outwardly therefrom in a horizontal plane removed from the plane of the second arm on the rock shaft, and a link connecting said last mentioned arms.

In testimony whereof I affix my signature in presence of two witnesses.

EDWIN M. WHEELOCK.

Witnesses:
R. H. JACOBSON,
H. A. BOWMAN.

Copies of this patent may be obtained for five cents each, by addressing the "Commissioner of Patents, Washington, D. C."